United States Patent

[11] 3,588,036

| [72] | Inventor | Robert M. Harter |
| | | Lyndonville, N.Y. |
| [21] | Appl. No. | 841,783 |
| [22] | Filed | July 15, 1969 |
| [45] | Patented | June 28, 1971 |
| [73] | Assignee | General Motors Corporation |
| | | Detroit, Mich. |

[54] VACUUM TORQUE ACTUATOR
1 Claim, 6 Drawing Figs.

[52] U.S. Cl. .................................................. 251/61, 92/47
[51] Int. Cl. ................................................... F16k 31/165
[50] Field of Search ........................................ 251/61, 298; 137/503, 510, 483, 500, 489; 92/39, 34, 47; 98/110, 118

[56] References Cited
UNITED STATES PATENTS

| Re. 26,690 | 8/1969 | Schach | 251/61X |
| 991,641 | 5/1911 | Plantinga | 137/501X |
| 1,471,380 | 10/1923 | Burchett | 137/483 |
| 1,711,999 | 5/1929 | Gaines | 137/503 |
| 2,041,916 | 5/1936 | Flint | 92/39X |
| 2,435,968 | 2/1948 | Kalix | 137/503X |
| 2,620,821 | 12/1952 | Leibing | 137/483 |
| 2,998,194 | 8/1961 | Curran et al. | 137/489X |
| 3,324,895 | 6/1967 | Johnson | 92/47X |
| 3,378,864 | 4/1968 | Cornes | 92/47X |
| 3,495,502 | 2/1970 | Bousso | 92/34X |

*Primary Examiner*—M. Cary Nelson
*Assistant Examiner*—R. B. Rothman
*Attorneys*—William S. Pettigrew and John C. Evans ABSTRACT: In preferred form, a vacuum-powered torque actuator having a plastic pie-shaped bellows. The bellows contracts to pivot an attached member when its air-filled interior is evacuated. Resultantly, an air damper connected to the member is positioned in an air duct to regulate airflow.

INVENTOR
Robert M. Harter
BY
J.C. Evans
ATTORNEY

VACUUM TORQUE ACTUATOR

This invention relates to a vacuum actuator for rotatably positioning an air damper within an air duct.

Vacuum motors have been utilized previously to position air dampers within air ducts of automobiles for regulating air flow into the passenger compartment. These vacuum motors typically include a housing having a flexible diaphragm extending across its hollow interior. Vacuum pressure introduced into the housing coacts with one side of the diaphragm to draw it and an attached arm against the force of a spring which holds the diaphragm in a normal position. The arm is attached at one end to the diaphragm and is normally connected to a crank arm of the air damper. Lineal movement of the arm in response to vacuum pressure on the diaphragm is translated into rotary motion by the crank arm to position the air damper. A disadvantage of these vacuum motors is their large size which is caused by the diaphragm having an area sufficient to move the air damper crank arm. Another disadvantage of these vacuum motors is their cost which is undesirably high due to the plurality of parts.

The vacuum-powered torque actuator described in the present application transmits vacuum forces directly into torque for positioning an air damper within an air duct. A pivotal member or rotor connected to the air damper is attached to an end of a plastic bellows. The other end of the plastic bellows is attached to a base which is anchored to the air duct. The plastic bellows has an air-filled interior which may be evacuated through a port in the base. Evacuation of the bellows causes it to contract which pivots the rotor and attached air damper. An advantage of this vacuum actuator is the elimination of linkage levers required by prior vacuum motors to transform lineal motion into rotary motion.

The plastic bellows which powers the subject actuator can be produced in large quantities at a desirably low-unit price. The bellows may be blow molded of polyethylene or polypropolene plastic. The blow-molding method produces a hollow thin wall bellows requiring little plastic material.

A plastic bellows may also be economically produced in large quantities by a closed molding technique using open cell foam plastic. After molding the urethane bellows, a resilient plastic skin is applied to the outer surface of the bellows. This skin prevents passage of air through the sides of the open cell structure. Evacuation of the bellows' open cell interior causes the bellows to contract and pivot an attached rotor which positions the air damper.

Therefore, an object of the inventor is to provide a vacuum-powered torque actuator having a pie-shaped plastic bellows which contracts upon evacuation of its air-filled interior to rotate an air damper for the regulation of airflow through an air duct.

A further object of the inventor is to provide a compact vacuum-powered torque actuator which directly transforms vacuum force into rotary motion.

Further objects and advantages of the present invention will be apparent from the following description, reference being had to the accompanying drawings wherein a preferred embodiment of the present invention is clearly shown.

Figure 1:
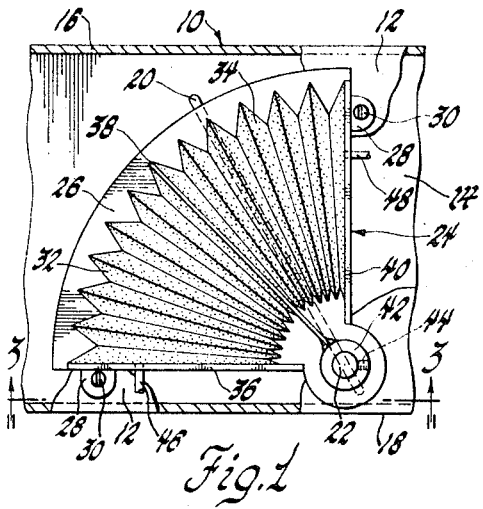
FIG. 1 is a fragmentary vertical view of an air duct supporting the subject torque actuator in a normal uncontracted condition.
Figure 2:
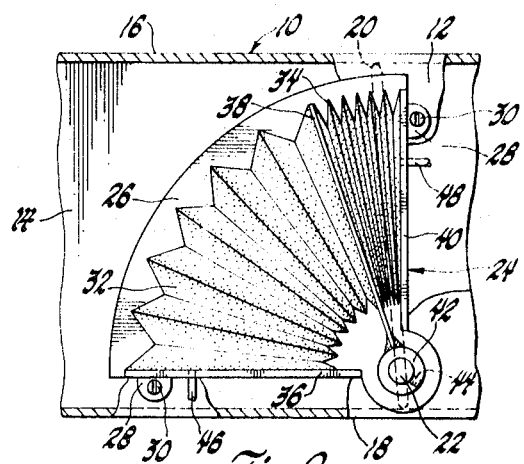
FIG. 2 is a fragmentary vertical view of the air duct shown in FIG. 1 supporting the torque actuator in a contracted condition.
Figure 3:
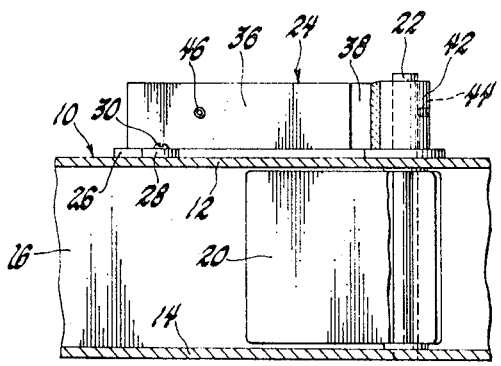
FIG. 3 is a horizontal sectioned view of the torque actuator taken along section line 3–3 of FIG. 1.

In FIGS. 1 through 3 of the drawings, a four-sided air duct 10 is illustrated having a front face 12, a rear face 14, a top face 16 and a bottom face 18. An air damper 20 within the air duct is attached to a shaft 22 whose ends are rotatably supported by front face 12 and rear face 14.

A vacuum-powered torque actuator 24 is secured to the front face 12 of the air duct. More particularly, a base portion 26 of the torque actuator 24 has tabs 28 adapted to be secured to front face 12 by screws 30. The torque actuator 24 includes a pair of pie-shaped bellows 32 and 34. An end of bellows 32 is attached to an upstanding end flange 36 on the base portion 26. The other end of bellows 32 is attached to a pivotal member or rotor 38. Likewise, one end of bellows 34 is attached to an upstanding end flange 40 and the other end is attached to rotor 38. The interior of bellows 32 and 34 is normally air filled. The bellows contracts and expands with the withdrawal or the addition of air respectively from its interior.

Rotor 38 is connected to the shaft 22 for rotation together for positioning the air damper 20 in air duct 10. More particularly, rotor 38 is attached to a ring 42 which is mounted on the end of shaft 22 which projects through the front face 12. Ring 42 is secured to the shaft 22 for rotation together by a setscrew 44.

A port 46 through end flange 36 extends into the interior of bellows 32. A port 48 through end flange 40 extends into the interior of bellows 34. Ports 46 and 48 are adapted to be connected to a vacuum source through valve means (not shown) to regulate the application of vacuum pressure alternately to bellows 32 and 34. FIG. 1 shows the torque actuator 24 in a normal uncontracted condition without vacuum pressure applied to either bellows. Damper 20 is shown in an intermediate position. FIG. 2 shows the condition of the vacuum actuator 24 with vacuum pressure applied to bellows 34 through port 48. Damper 20 is then in a fully closed position blocking airflow through duct 10. When vacuum pressure is applied to bellows 32 through port 46, the bellows 32 assumes a contracted condition (not shown) with bellows 34 extended and rotor 38 moved toward end flange 36. This movement of rotor 38 toward end flange 36 causes the damper 20 to assume a fully opened position (not shown) within duct 10.

Figure 5:
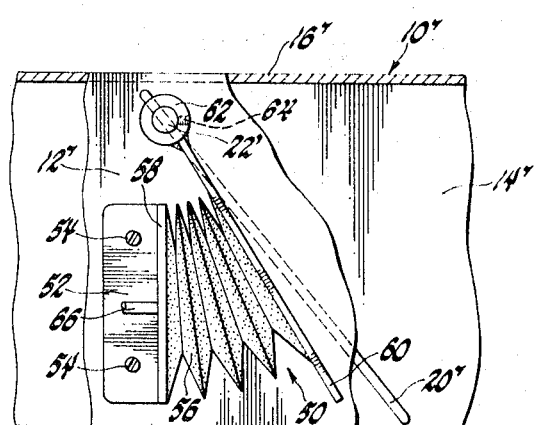
FIG. 5 is a fragmentary vertical view of the air duct shown in FIG. 4 supporting the subject torque actuator in a contracted condition.
Figure 4:
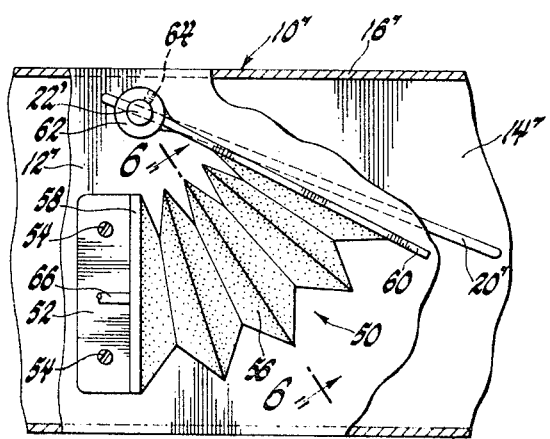
FIG. 4 is a fragmentary vertical view of an air duct supporting a second embodiment of the subject torque actuator in a normal uncontracted condition.

Another embodiment of the torque actuator is shown in the FIGS. 4 and 5. An air duct 10' is illustrated having a front face 12', a rear face 14', a top face 16' and a bottom face 18'. An air damper 20' within duct 10' is attached to a shaft 20' which extends through duct 10'. The ends of shaft 20' are supported for rotation by front face 12' and rear face 14' of the duct.

A torque actuator 50 is secured to the front face 12' of air duct 10'. More particularly, a base portion 52 of torque actuator 50 is affixed to the front face 12' by screws 54. A pie-shaped plastic bellows 56 is attached at one end to an upstanding end flange 58 on the base and attached at the other end to a pivotal member or a rotor 60. Bellows 56 is made of flexible plastic material and has an air-filled interior. Rotor 60 is affixed to a ring 62 mounted on an end of shaft 22' which projects through front face 12'. Ring 62 and shaft 22' are connected for rotation together by a setscrew 64.

A port 66 through end flange 58 extends into the interior of bellows 56. Torque actuator 50 is shown in FIG. 4 in a normal uncontracted condition without vacuum pressure applied to port 66. The natural resiliency of the plastic bellows 56 normally holds rotor 60 and damper 25 in an opened position. When vacuum pressure is applied to the interior of bellows 56 through the port 66, rotor 60 and damper 20' are moved toward the end flange 58 in a closed position which blocks airflow through air duct 10' as shown in FIG. 5. When the interior of bellows 56 is again disconnected from vacuum pressure, the resilient bellows moves rotor 50 into the open position shown in FIG. 4.

Figure 6:
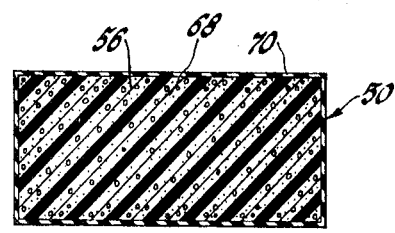
FIG. 6 is a sectional view of the torque actuator taken along section line 6–6 of FIG. 4 and looking in the direction of the arrows.

FIG. 6 is a cross-sectional view of the bellows shown in FIG. 4 showing the construction of one embodiment of the torque actuator. FIG. 6 could equally well pertain to the plastic bellows shown in FIGS. 1 through 3. The interior core 68 of bellows 56 is molded of open cell foam urethane. The urethane is chemically expanded within a closed mold to a pie shape. A thin plastic skin 70 of resilient plastic, such as polyethylene or polypropolene is applied to the outer surface of the open cell urethane core 68. The skin 70 prevents airflow through the sides of the bellows when vacuum pressure is applied to port 66.

A second embodiment of bellows 56 (not shown) is similar to the illustration in FIG. 6 but the plastic skin 70 is blow molded of polyethylene or polypropolene to produce a hollows bellows without the use of foam urethane. Sufficient plasticizer is used to produce a resilient plastic bellows which readily contracts upon the evacuation of its interior.

While the embodiment of the present invention as herein described constitutes a preferred form, it is to be understood that other forms may be adapted and still be within the scope of this invention.

I claim:

1. A vacuum pressure operated torque actuator for rotating an air damper within an air duct for controlling the passage of air therethrough comprising: a base member adapted to be affixed to said air duct; a rotatable shaft connected to said air damper and supported through said air duct normal to said base member; a flange portion extending normally from said base member; a pivotal member operably connected to said rotatable shaft for rotation together; an elongated bellows connected at one end to said flange portion and at its other end to said pivotal member; said elongated bellows including a molded core of open cell plastic material with corrugated side surfaces; an air impervious resilient plastic covering on the surface of said bellows core; a vacuum port through said flange portion adapted to be connected to a source of vacuum pressure and whereby the application of vacuum pressure to said molded core causes its evacuation and resultant contraction which rotates said pivotal member toward said flange portion and repositions said interconnected shaft and air damper.